US012227408B2

(12) United States Patent
Gray

(10) Patent No.: US 12,227,408 B2
(45) Date of Patent: Feb. 18, 2025

(54) FLUID DISPENSING DEVICE WITH REDUCED OPENING FORCE

(71) Applicant: John M. Gray, Cincinnati, OH (US)

(72) Inventor: John M. Gray, Cincinnati, OH (US)

(73) Assignee: OPW FUELING COMPONENTS, LLC, Hamilton, OH (US)

( * ) Notice: Subject to any disclaimer, the term of this patent is extended or adjusted under 35 U.S.C. 154(b) by 150 days.

(21) Appl. No.: 18/095,809

(22) Filed: Jan. 11, 2023

(65) Prior Publication Data

US 2024/0228260 A1 Jul. 11, 2024

(51) Int. Cl.
*B67D 7/44* (2010.01)

(52) U.S. Cl.
CPC .................................... *B67D 7/44* (2013.01)

(58) Field of Classification Search
CPC .................................. B67D 7/42; B67D 7/44
USPC ....................................................... 141/206
See application file for complete search history.

(56) References Cited

U.S. PATENT DOCUMENTS 2,686,626 A 10/1951 Slattery
2,795,391 A 6/1957 Krone et al.
2,841,191 A * 7/1958 Fraser .................... B67D 7/48 141/217
3,866,637 A 2/1975 Swain et al.
4,596,278 A 6/1986 Fink, Jr.
5,435,357 A * 7/1995 Woods ................ B67D 7/0488 141/46
6,634,395 B1 10/2003 Mitchell
6,659,373 B1 * 12/2003 Heren .................... B67D 7/36 239/570
6,851,628 B1 2/2005 Garrison et al.
6,951,229 B2 10/2005 Garrison et al.
8,528,609 B2 * 9/2013 Garrison ................ B67D 7/54 141/206
8,631,837 B2 1/2014 Lauber et al.
9,260,286 B2 2/2016 Garrison et al.
11,060,618 B2 7/2021 Mahn et al.
2012/0227862 A1 9/2012 Garrison et al.
2014/0311579 A1 10/2014 Nanaji
2016/0176700 A1 6/2016 Clever et al.

OTHER PUBLICATIONS

U.S. Mail Stop PCT, International Search Report and Written Opinion issued Jun. 12, 2024, which pertains to PCT Application No. PCT/US2024/011176. 20 pgs.

* cited by examiner

*Primary Examiner* — Timothy L Maust
(74) *Attorney, Agent, or Firm* — Thompson Hine LLP

(57) ABSTRACT

A nozzle for dispensing fluid including a nozzle body having a fluid path therein through which fluid is configured to flow in a downstream direction. The nozzle further includes a valve having a valve body positioned in the fluid path and movable between a closed position wherein the valve body sealingly engages a valve seat to generally block fluid from flowing therethrough, and an open position wherein the valve body is spaced away from the valve seat to generally allow fluid to flow therethrough. At least part of a surface of the valve body positioned upstream of the valve seat is configured to be fluidly isolated from a pressure of fluid in the fluid path upstream of the valve seat when the valve is in the closed position.

29 Claims, 9 Drawing Sheets

FLUID DISPENSING DEVICE WITH REDUCED OPENING FORCE

The present invention is directed to a dispensing nozzle, and more particularly, to a fluid dispensing nozzle with that can be opened with a reduced force.

BACKGROUND

Fluid or fuel dispensers are widely utilized to dispense fluid or fuels, such as gasoline, diesel, natural gas, biofuels, blended fuels, propane, oil, ethanol or the like, into the fuel tank of a vehicle or other receptacle. Such dispensers typically include a actuator that is manually operable to open a valve, which in turn enables the dispenser to dispense fluid. However, when the nozzle dispenses fluid that is under pressure, the pressurized nature of the fluid can make it more difficult to open the valve.

SUMMARY

In one embodiment, the invention is a system for providing a reduced opening force for a dispensing nozzle. More particularly, in one embodiment the invention is a nozzle for dispensing fluid including a nozzle body having a fluid path therein through which fluid is configured to flow in a downstream direction. The nozzle further includes a valve having a valve body positioned in the fluid path and movable between a closed position wherein the valve body sealingly engages a valve seat to generally block fluid from flowing therethrough, and an open position wherein the valve body is spaced away from the valve seat to generally allow fluid to flow therethrough. At least part of a surface of the valve body positioned upstream of the valve seat is configured to be fluidly isolated from a pressure of fluid in the fluid path upstream of the valve seat when the valve is in the closed position.

DETAILED DESCRIPTION

Figure 1:
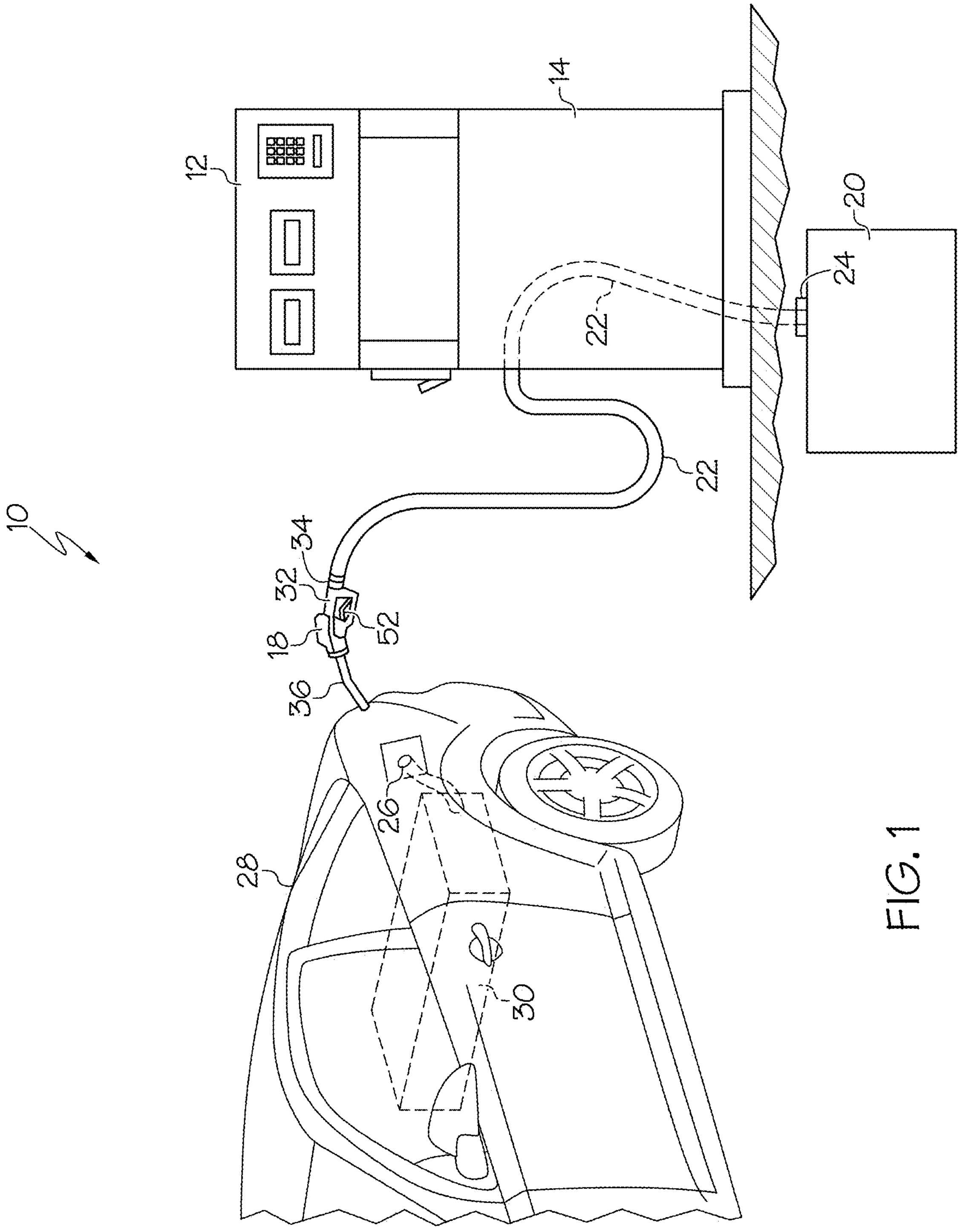
FIG. 1 is a schematic representation of a refilling system, with the nozzle positioned to be inserted into a vehicle fill pipe.

FIG. 1 is a schematic representation of a refilling system 10 including a dispenser 12. The dispenser 12 includes a dispenser body 14, a hose 16 coupled to the dispenser body 14, and a nozzle 18 positioned at the distal end of the hose 16. The hose 16 may be generally flexible and pliable to allow the hose 16 and nozzle 18 to be positioned in a convenient refilling position as desired by the user/operator.

The dispenser 12 is in fluid communication with a fuel/fluid storage tank 20 via a liquid/fluid conduit or fluid path 22 that extends from the dispenser 12 to the storage tank 20. The storage tank 20 and/or dispenser 12 can include or be fluidly coupled to a pump 24 which is configured to draw liquid/fluid out of the storage tank 20 and supply the liquid/fluid to the dispenser 12/nozzle 18. The nozzle 18 can be inserted into a fill pipe 26 of a vehicle 28 and operated to fill/refuel a fuel tank/fluid receptacle 30 of the vehicle 28, or to fill some other fuel/fluid containment vessel.

The nozzle 18/dispenser 12 can also be configured to capture and route vapors being expelled from the fuel tank 30 during refueling via a vapor recovery system (not shown). In this case the nozzle 18 and hose 16 can each include a vapor recovery path (not shown) that is fluidly isolated from the fluid path 22. The system 10 and nozzle 18 can be utilized to store/dispense any of a wide variety of fluids, liquids or fuels or fuel additives, including but not limited to petroleum-based fuels or fluids, such as gasoline, diesel, natural gas, biofuels, blended fuels, propane, oil, ethanol, diesel exhaust fluid ("DEF"), and the like.

Figure 2:
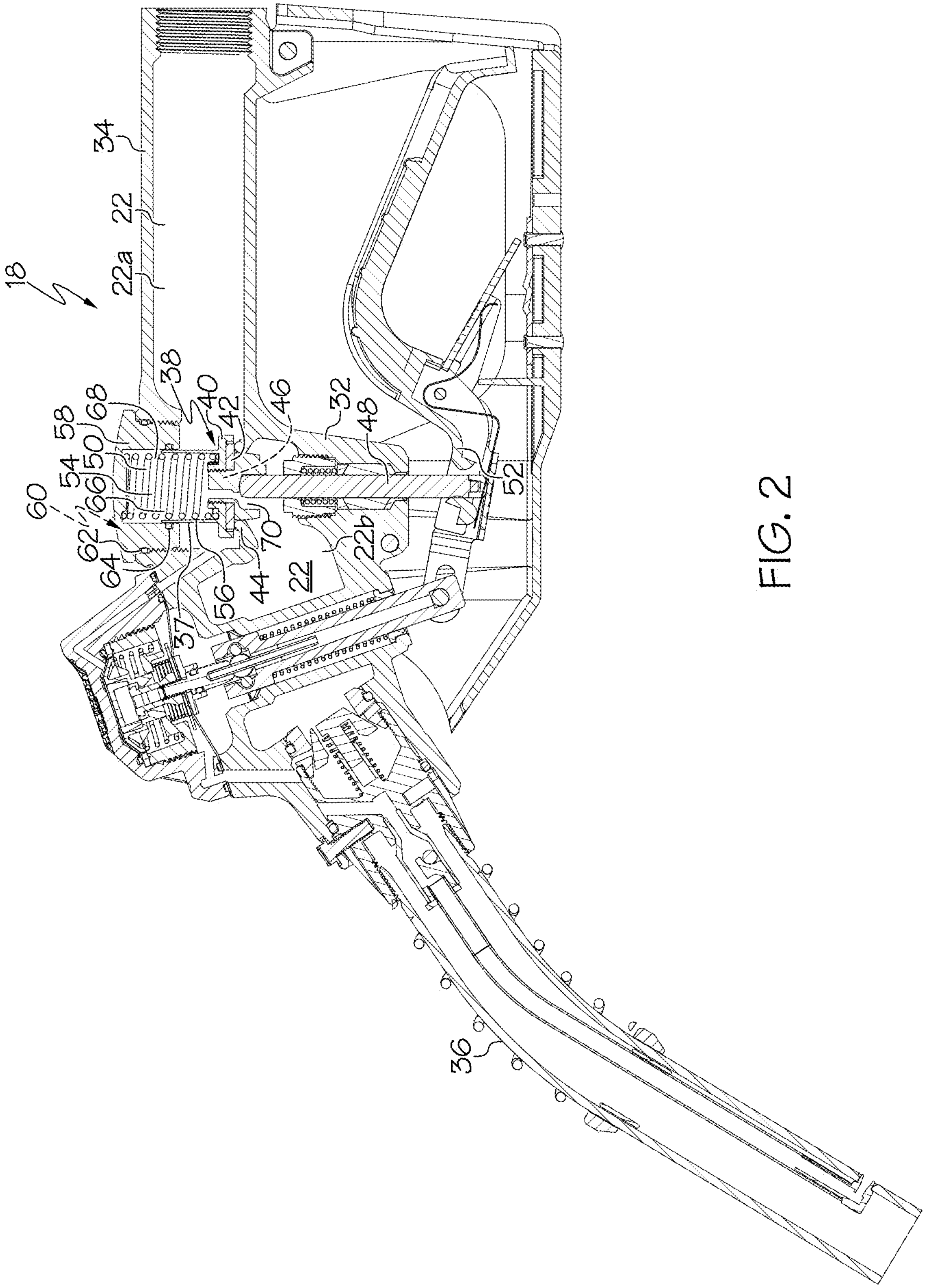
FIG. 2 is a side cross section of a nozzle of the system of FIG. 1, with the valve in its closed position.
Figure 3:
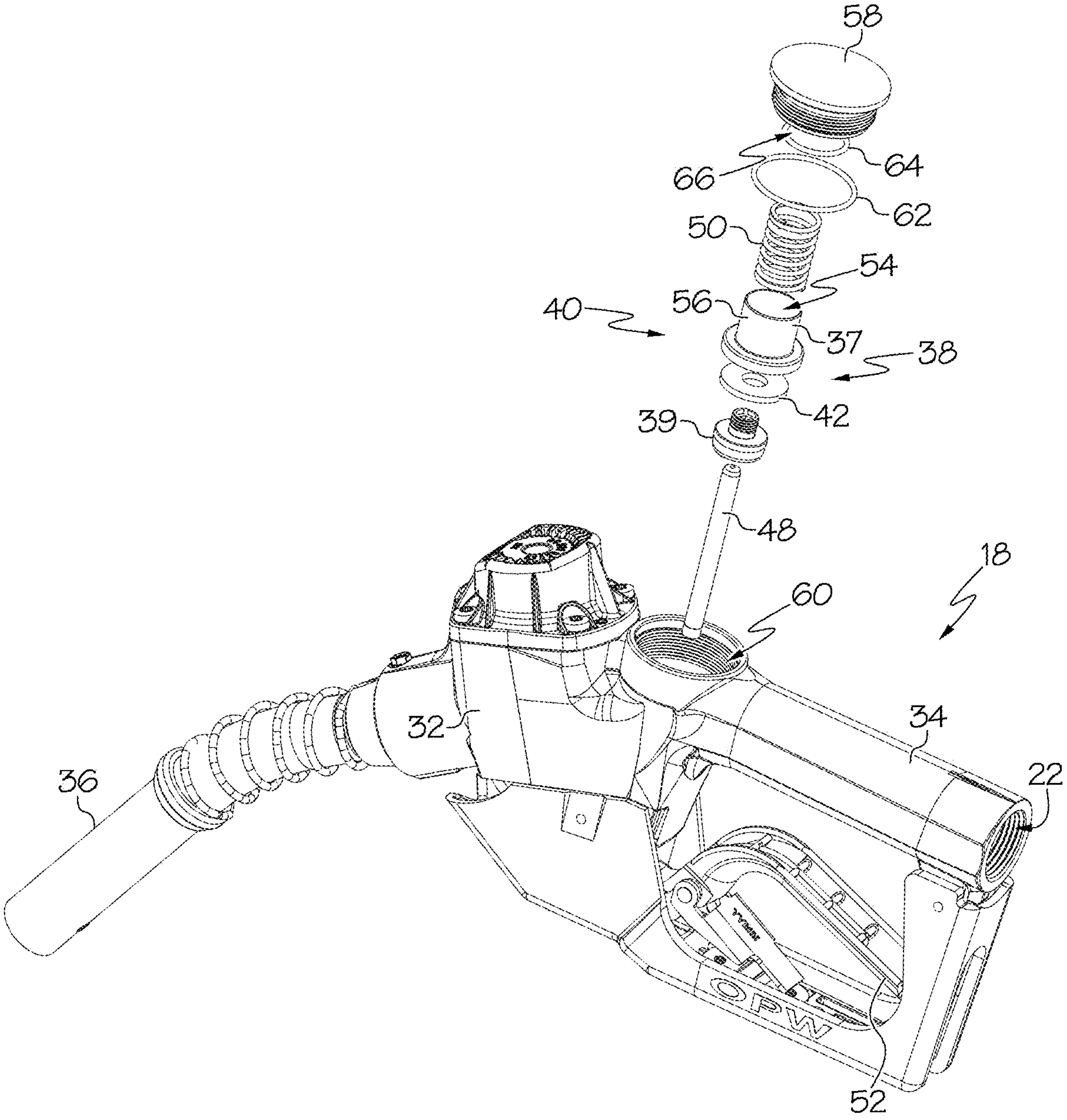
FIG. 3 is an exploded view of the nozzle of FIG. 2.
Figure 4:
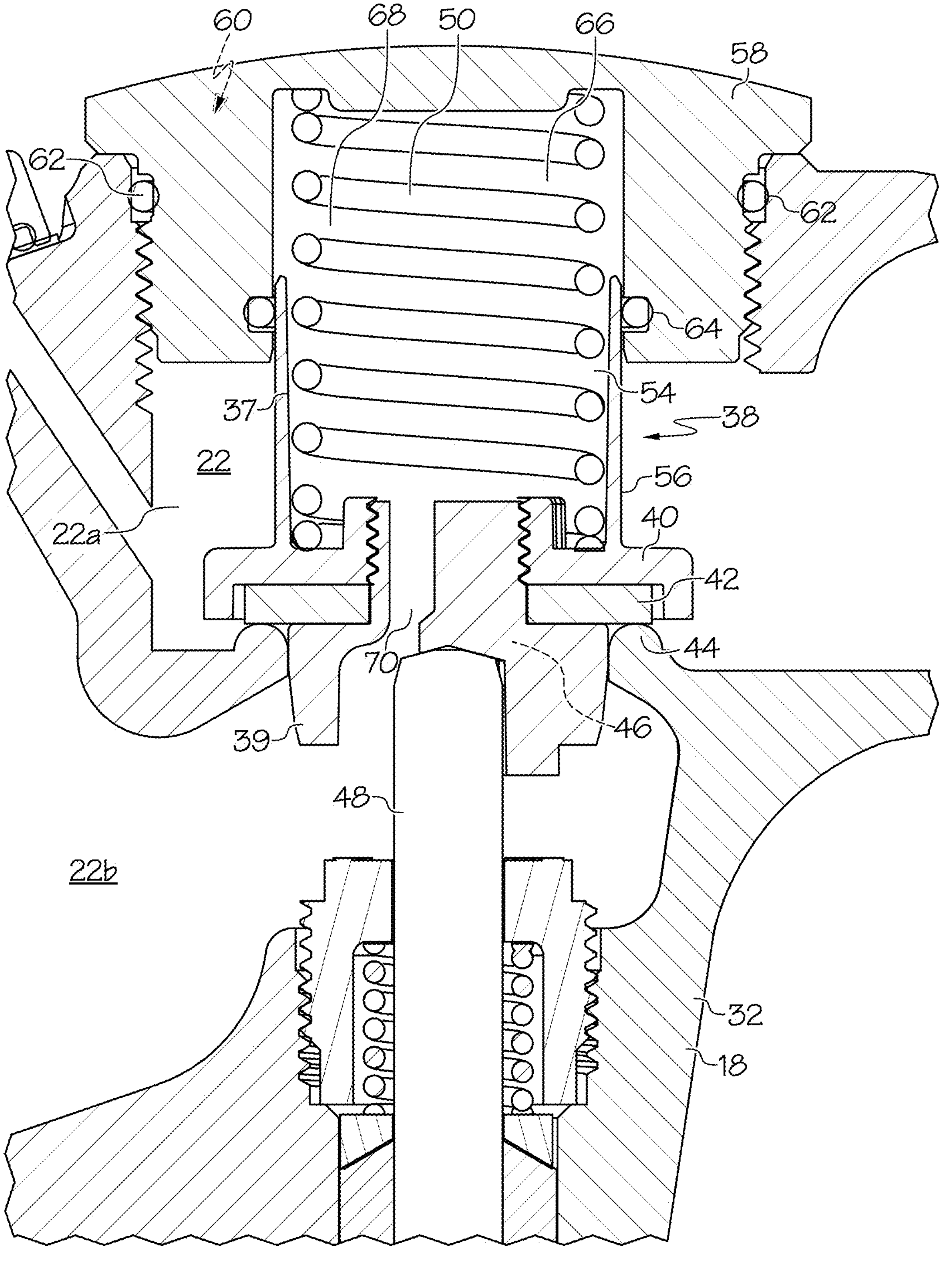
FIG. 4 is a detail view of the valve of FIG. 2.

With reference to FIGS. 1-3, the nozzle 18 may include a nozzle body 32 having or defining a generally cylindrical inlet 34 leading directly to or forming part of the fluid path 22 of the nozzle 18, and a spout 36 coupled to the nozzle body 32. The inlet 34 is configured to be fluidly connected to an associated hose 16, such as by threaded attachment.

Figure 5:
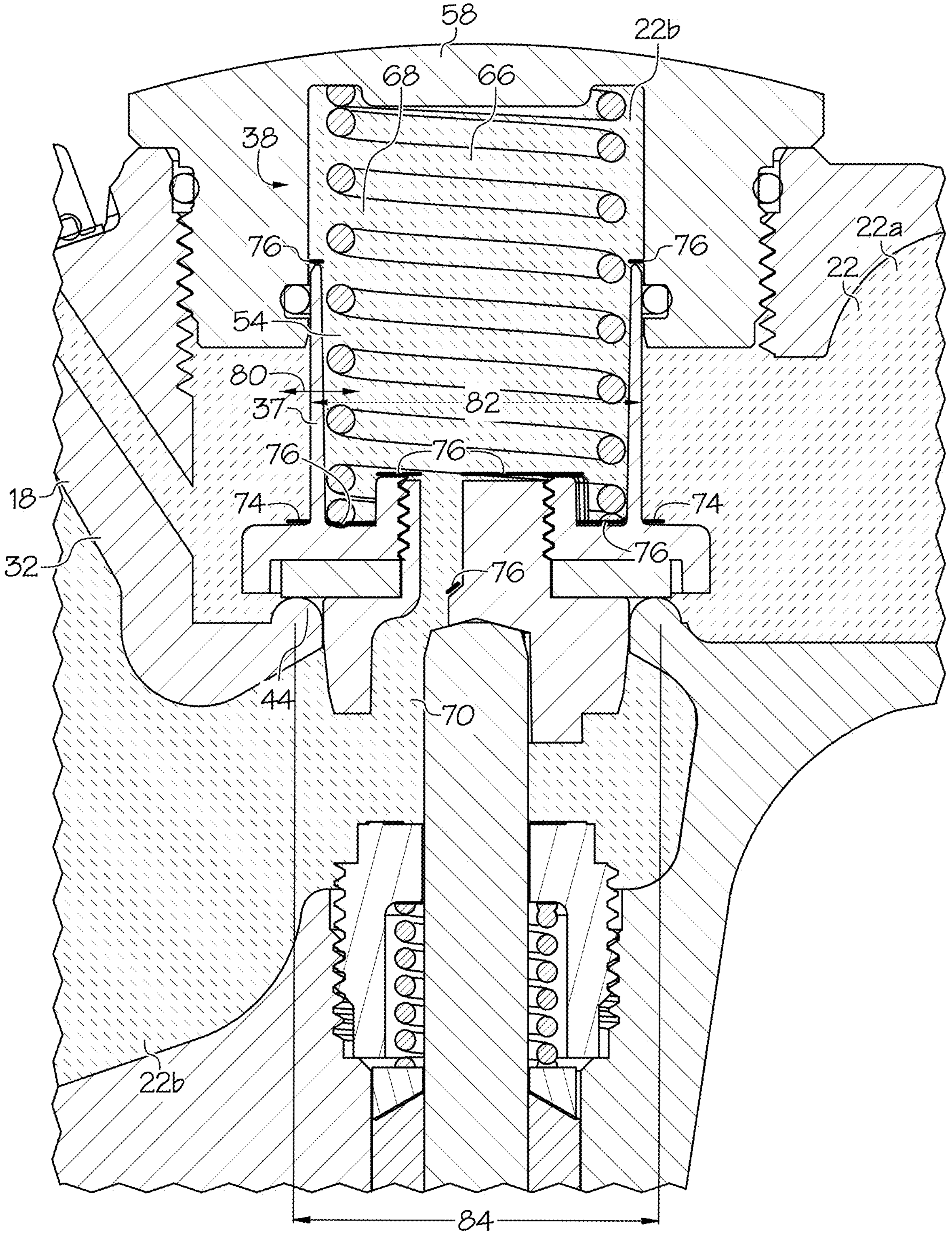
FIG. 5 is another detail view of the valve of FIG. 2.
Figure 6:
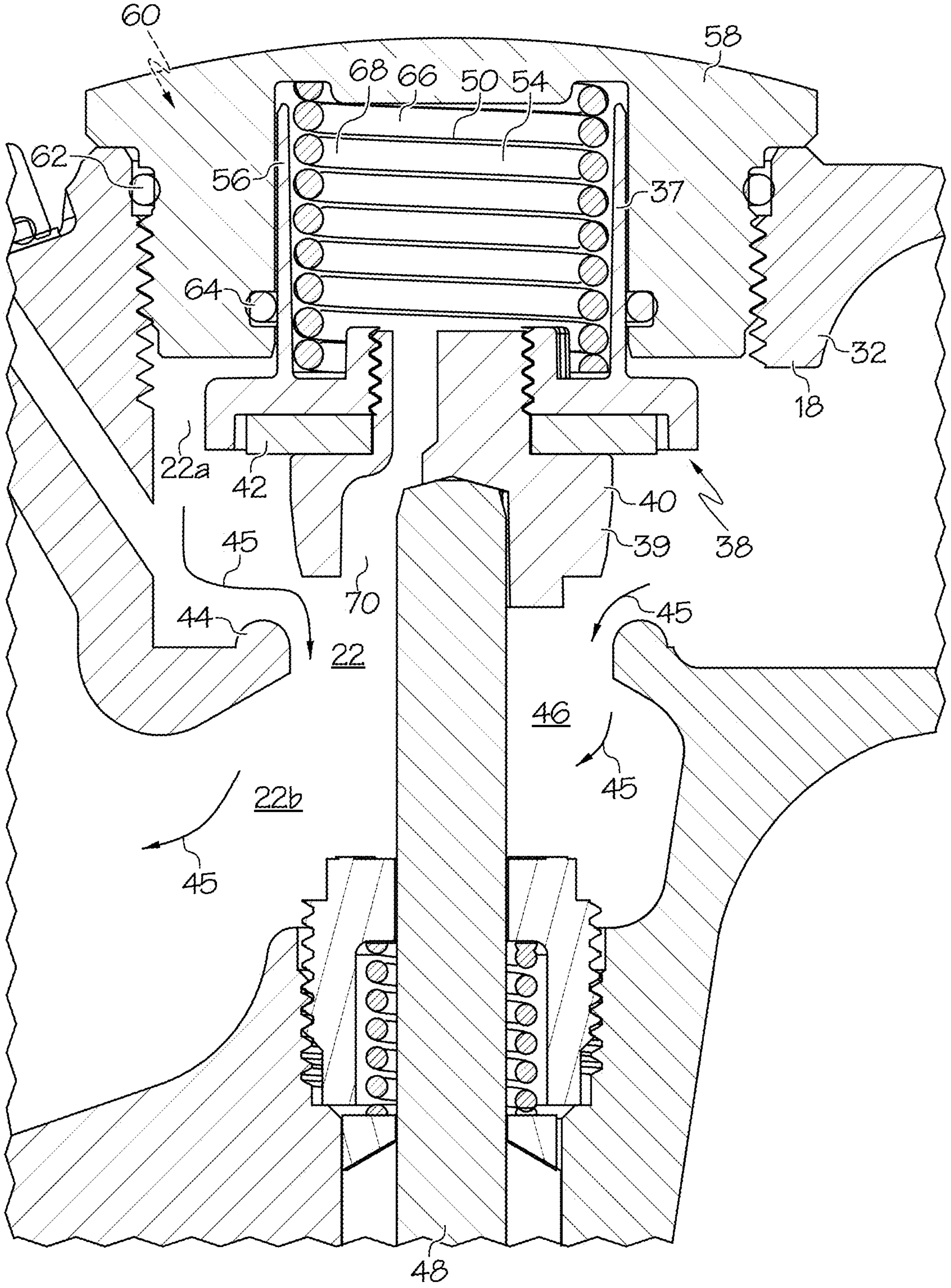
FIG. 6 illustrates the valve of FIG. 4 in an open position.
Figure 7:
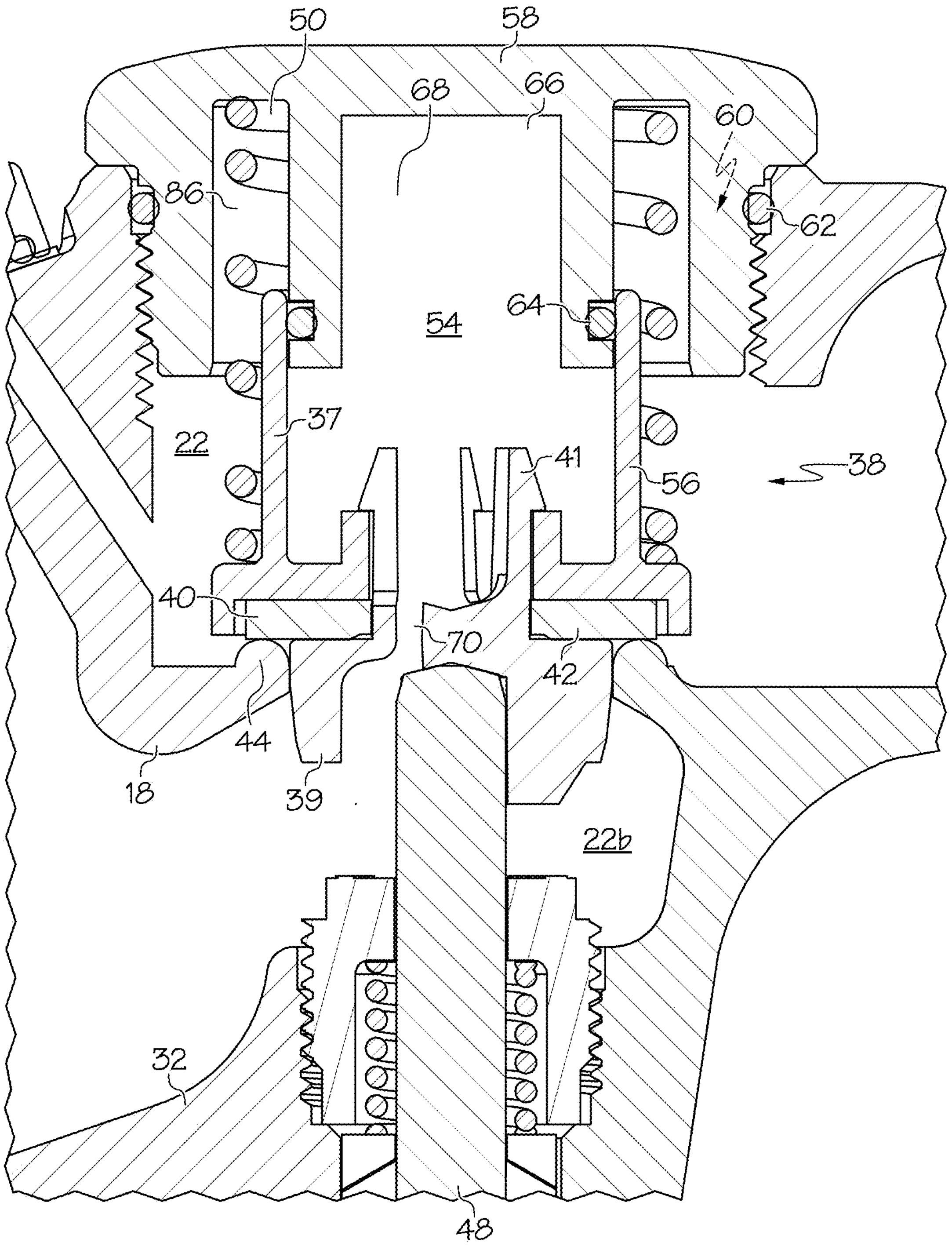
FIG. 7 illustrates an alternate embodiment of the valve of FIG. 4.
Figure 8:
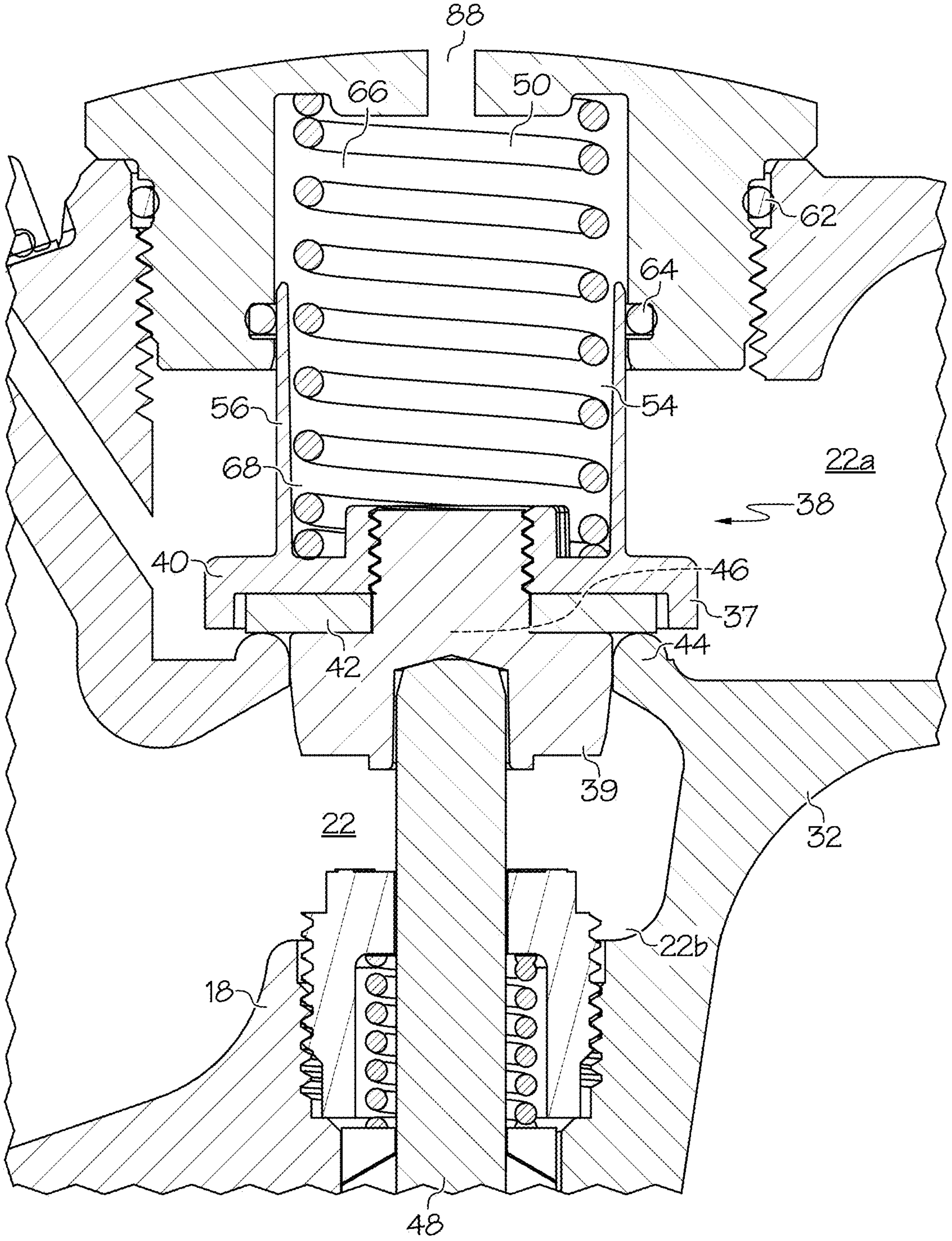
FIG. 8 illustrates another alternate embodiment of the valve of FIG. 4.

With reference to FIGS. 2-7, the nozzle 18 can include a valve 38 positioned in or in fluid communication with the fluid path 22 to control the flow of fluid to be dispensed therethrough. The valve 38 can include an axially movable valve body 40 including a base component 37 that is generally cylindrical in the illustrated embodiment. The valve body 40 can include a sealing component 42 coupled to an axially lower surface of the base component 37, where the sealing component 42 is generally annular in one case. The valve body 40 can further include an end cap 39 that is threaded into the base component 37 (or otherwise coupled to the base component 37, such as using a snap-fit component 41 as shown in FIG. 7) to trap the sealing component 42 therebetween. The base component 37/valve body 40 can include a wall 56 positioned on the upper/upstream side thereof, defining a chamber 54 therein. The wall 56 can be generally cylindrical in one case such that the chamber 54 is also generally cylindrical.

The valve 38/nozzle body 32 can include a valve seat 44 positioned adjacent to the valve body 40 and extending around a valve orifice 46. In the illustrated embodiment the valve seat 44 is a raised bead having a generally semicircular profile extending entirely circumferentially around the valve orifice 46. However the valve seat 44 can have various other shapes and configurations, including seats 44 that are generally flat or angled in cross section, rather than semicircular. In the illustrated embodiment, the outer diameter/dimension of the base component 37 is illustrated by the diameter/dimension 82, and the outer diameter/dimension of the seat 44 is represented by diameter/dimension 84.

The sealing component 42 can be made of a relatively soft/pliable material to form a seal with the valve seat 44 when the valve 38/valve body 40 is in its closed position, as will be described in greater detail below. The portion of the fluid path 22 positioned upstream of the valve seat 44 with regard to the direction of the flow of fluid is designated the upstream fluid path 22*a*, and the portion of the fluid path 22 positioned downstream of the valve seat 44 with regard to the direction of the flow of fluid is designated the downstream fluid path 22*b*. However, as will be described in greater detail below, certain portions of the downstream fluid path 22*b* can be positioned physically/geometrically above the valve seat 44 and/or on the upstream "side" of the valve seat 44.

The valve body 40 is carried on, and/or operatively coupled to, a fluid valve stem 48, and is biased to its closed position by a biasing member 50, such as a spring, compressible element, magnet, etc. In particular, in the illustrated embodiment the biasing member 50 is positioned above the valve body 40 and configured to be a state of compression. When the valve 38/valve body 40 is in the closed position, the valve body 40/sealing component 42 sealingly engages the valve seat 44/valve orifice 46, as urged by the biasing member 50, as shown in FIGS. 2, 4, 5, 7, 8 and 9. When the valve 38/valve body 40 is in the closed position the valve 38/valve body 40 thereby forms a seal and blocks or prevents (or generally blocks or prevents) the flow of fluid through the valve 38 and/or through the fluid path 22 and/or through the valve orifice 46.

With reference to FIG. 2, a bottom of the fluid valve stem 48 is positioned on or operatively coupled to a handle/lever/actuator 52 which can be manually raised or actuated by a user to open and/or close the valve 38. Thus, in order to operate the nozzle 18 and dispense fluid, the user can manually raise the lever 52, and when refilling conditions are appropriate, the lever 52 engages and raises the fluid valve stem 48, thereby opening the valve 38 and further compressing the biasing member 50, as shown in FIG. 6. When the valve 38/valve body 40 is open, the valve body 40/sealing component 42 are spaced away from the valve seat 44/valve orifice 46, and the valve 38 thus allows or generally allows fluid to flow through the valve orifice 46/valve 38 and/or through the fluid path 22 of the nozzle 18 in the direction of the arrows 45 of FIG. 6. The fluid, which may be under pressure, then flows through the spout 36 in a downstream direction, exiting at a distal end thereof.

The nozzle 18/nozzle body 32 can include a cap 58 that is (threadedly, in one case) positioned in and sealingly covers a cap opening 60 in the nozzle body 32. A seal 62 can be positioned between the cap 58 and the remainder of the nozzle body 32, and another seal 64 can be positioned between the cap 58 and the wall 56 of the base component 37/valve body 40. The nozzle body 32/cap 58 can include or define a chamber 66 that closely/sealingly receives the wall 56/chamber 54 therein, with the seal 64 positioned therebetween.

The chambers 54, 66 thereby together form a cavity 68 that is positioned physically/geometrically above/on the upstream side of the valve 38/valve body 40/seat 44, on the same side as the valve body 40, when the nozzle 18 is in the dispensing position, in one case as shown in FIGS. 1-3. In one case, when the nozzle 18 is in the dispensing position the inlet 34 and/or a central axis of the inlet 34 is horizontally or generally horizontally oriented and/or the distal end of the spout 36 forms an angle of between about thirty degrees and about ninety degrees, and in another case an angle of between about forty five degrees and about seventy five degrees, with a horizontal axis. In this case "geometrically above" or "physically above" can be determined with regard the direction of the flow of fluid as it flows through the seat 44/orifice 46 and/or with respect to a gravitational frame of reference when the nozzle 18 is in the dispensing position.

At least part (the upper portion/surface, in the illustrated embodiment) of the valve body 40 is positioned in the cavity 68/chamber 54, and the cavity 68/chambers 54, 66 are thereby in fluid communication with at least part of the valve body 40. In the embodiments of FIGS. 2-6 and 8, the biasing member 50 is positioned in the cavity 68/chambers 54, 66. The cavity 68/chambers 54, 66 can be in fluid communication with and/or form part of the downstream fluid path 22*b*.

The end cap 39/valve body 40/sealing component 42 can include an opening 70 therein that extends from an upper/upstream surface/side to a lower/downstream surface side thereof. In the illustrated embodiment only a single opening 70 is shown, but if desired multiple openings can be provided, such as multiple openings circumferentially spaced about the valve body 40. In addition, the opening(s) 70 can have a tortuous path if desired which can be used to control the speed of closing of the valve 38, but in one case the opening(s) 70 extends through an entire thickness of valve body 40 in a direction of movement of the valve body 40.

When the valve 38 is closed, the opening 70 is in fluid communication with, and thereby provides fluid communication between, the cavity 68/chambers 54, 66 and the portions of the fluid path 22 positioned geometrically below/downstream of the valve 38/valve body 40/seat 44 (e.g. the downstream fluid path 22*b*). In this manner, as shown in FIG. 5, when the valve 38 is in the closed position, pressure and/or fluid in the cavity 68/chambers 54, 66 (shown in a downwardly angled shading pattern, in a left-to-right direction) is fluidly isolated from pressure and/or fluid generally positioned above/upstream of the valve 38/valve body 40/seat 44 (shown in an upwardly angled shading pattern; e.g. the upstream fluid path 22*a*). In addition, in this configuration, pressure and/or fluid in the cavity 68/chambers 54, 66 is in fluid communication with pressure/fluid generally positioned below/downstream of the valve 38/valve body 40/seat 44.

When the valve 38 is in the closed position, the opening 70 thereby is in fluid communication with fluid/pressure in the downstream fluid path 22*b* positioned on a first side, geometrically or physically downstream/below the valve seat 44, and is also in fluid communication with fluid/pressure in the downstream fluid path 22*b* in the cavity 68 positioned on a second, opposite side, geometrically or physically upstream/above the valve seat 44 when the valve 38 is in the closed position. The opening 70 enables at least part of the fluid in the fluid path 22 positioned downstream of the valve seat 44 in the flow direction (e.g. the downstream fluid path 22*b*); that is, fluid in the cavity 68, to be positioned physically/geometrically above/upstream of the valve seat 44.

Figure 9:
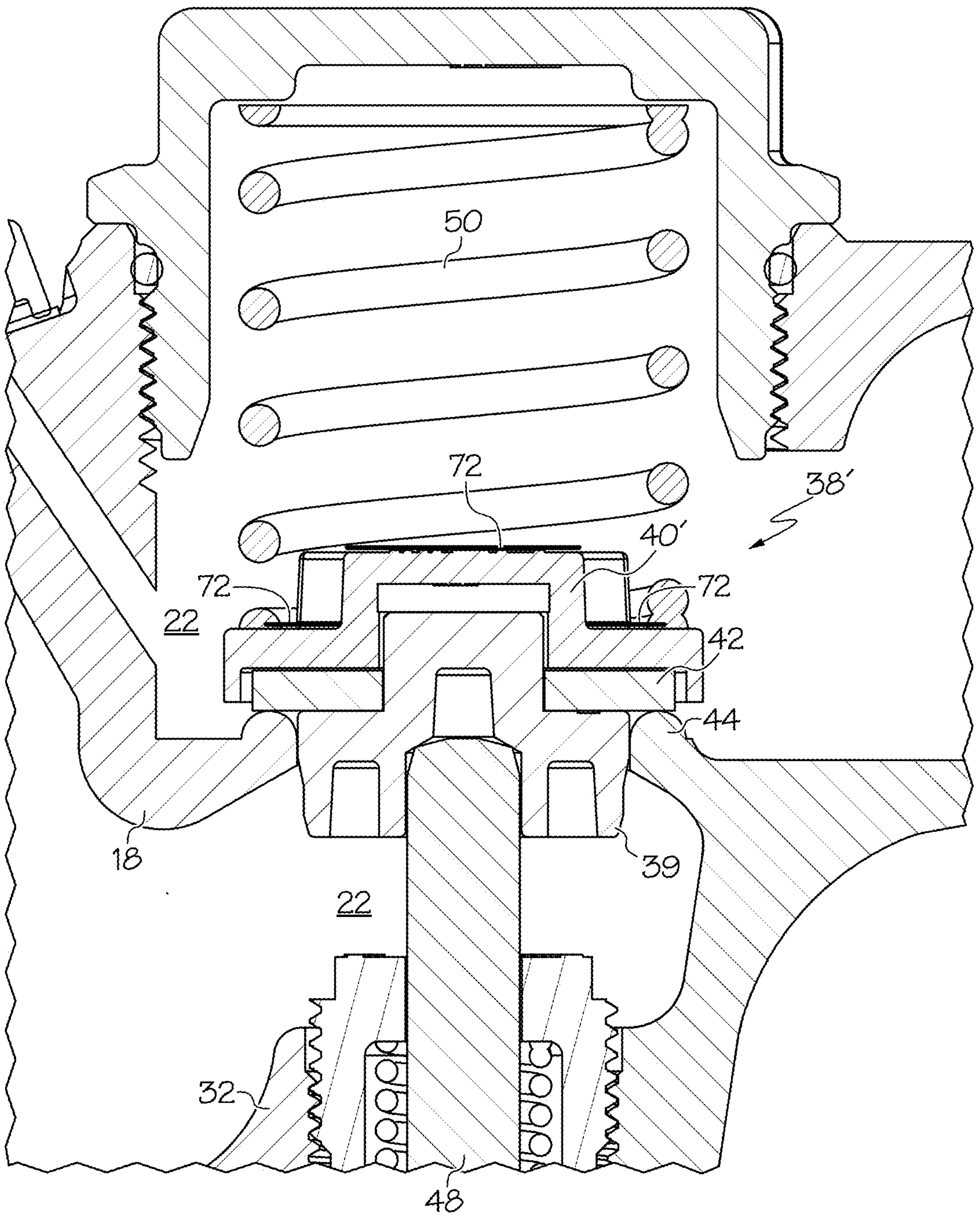
FIG. 9 illustrates a valve without a reduced opening force feature.

Fluid introduced into the fluid path 22 (upstream fluid path 22*a*)/inlet 34 of the nozzle 18 can be at a relatively high pressure, in one case around 50 psi, but in other cases as high as around 75 or around 100 psi or higher. Thus, when the valve 38' is closed, in systems as shown in FIG. 9, the relatively high pressure of fluid located upstream of the valve 38'/valve body 40'/seat 44 acts upon the entire upper/upstream surface 72 of the valve 38'/valve body 40' positioned radially inside the seat 44. The pressure force urges the valve 38'/valve body 40' into the closed position. This pressure force can make it difficult to open the valve 38', as the user/actuator 52 must overcome both the biasing force of the biasing member 50 and the pressure force acting on the upper/upstream surface 72 of the valve 38'/valve body 40'. Once the valve 38' is open, the valve 38' is exposed to equal pressure on both sides of the valve seat 44, and the predominant force the user must apply to keep the valve 38' open is a force opposing the biasing member 50. The high initial force required to open the valve 38' can lead to a "pop" open feeling to the user when operating the actuator 52, and/or can make it difficult to control the actuator 52 when the valve 38' is near the closed position, making it difficult to meter small amounts of fluid.

In contrast, in the embodiment of FIG. 5, the pressure of fluid upstream of the valve 38/valve body 40/seat 44 with regard to the flow direction (e.g. pressure in the upstream fluid path 22*a*) acts only on a portion of the valve 38/valve body 40, shown as the radially outer surface 74. The surface 74 is located/defined by the portion/surface area on the upper surface of the valve 38/valve body 40 located radially between the diameter 82 and the diameter 84. The portions of the valve 38/valve body 40/seat 44 positioned radially outside the surface 74 are acted upon by pressure of the upstream fluid path 22*a* on both the upper and lower sides thereof, and thereby cancel each other out. The pressure of the downstream fluid path 22*b* acts on the remainder of the upper surface area of the valve 38/valve body 40 (shown as surfaces 76, located radially inside the surface 74).

The fluid in the downstream fluid path 22*b* is typically at a significantly lower than pressure than fluid in the upstream fluid path 22*a* when the valve 38 is closed, and may be at a pressure between about 0 and about 2 psi in one case. Thus, by exposing the upper/upstream surface area 76 of the valve 38/valve body 40 to the lower pressure of the downstream fluid path 22*b*, the force required to open the valve 38 is significantly reduced, leading to ease of operation. In addition, even if the fluid in the downstream fluid path 22*b* is at a relatively high pressure, the pressure in the cavity 68 acting on the upper surface of the valve 38/valve body 40 is balanced or offset by fluid in the downstream fluid path 22*b* outside the cavity 68 acting on the lower surface of the valve 38/valve body 40 (in this case acting on the lower surface of the end cap 39), and thus the valve 38 remains easy to open.

By way of further explanation, effective surfaces/surface areas of the valve body 40, oriented or extending perpendicular (at least partially perpendicular, that is, not parallel) to the direction of opening/closing movement of the valve body 40, and radially aligned with/located within the orifice 46, can be acted upon by pressures to inhibit or aid in opening or closing of the valve 38/valve body 40. Thus the effective surfaces/surface areas may be positioned radially inside the valve seat 44 and overlap with the orifice 46 in the axial direction. With reference to FIG. 5, outer lip/surface 74 is exposed to relatively high pressure of fluid in the upstream fluid path 22*a*, while exposed surface(s) 76 are exposed to relatively low pressure of fluid positioned in the downstream fluid path 22*b* (where the surfaces 74, 76 are marked with thicker lines for illustrative purposes in FIG. 5) when the valve 38 is in its closed position. In comparison, in FIG. 9, the entire upper surface 72 of the valve body 40' is exposed to relatively high pressure of fluid positioned in the upstream fluid path 22*a*.

Thus it can be seen at least part of the surface (exposed surface 76, in the illustrated embodiment) of the valve body 40, which can be an outermost and/or upstream-most surface of the valve body 40, positioned geometrically upstream of the valve seat 44, is fluidly isolated from pressure/fluid positioned upstream (with regard to the flow direction) of the valve 38/valve body 40/seat 44, and/or is in fluid communication with pressure/fluid positioned downstream (with regard to flow direction) of the valve 38/valve body 40/seat 44. In one case, the exposed surface 76 is at least about 25% of a surface area or effective surface area, and in another case at least about 50% of a surface area or effective surface area, and in yet another case at least about 66% of a surface area or effective surface area, and in yet another case at least about 80% of a surface area or effective surface area of the upper surface area or effective surface area of the valve body 40, to thereby sufficiently reduce pressure forces applied to the valve body 40. In this manner at least 25%/50%/66%/80% of a surface area of the exposed/upstream surface of the valve body 40 is fluidly isolated from the pressure of fluid in upstream fluid path 22*a* when the valve 38 is in the closed position. In another case, the exposed surface 76 includes the geometric center of the upstream surface of the valve body 40 to enable smooth opening/closing thereof without binding or hesitation.

It should be noted that the fluid positioned downstream (or generally downstream) of the valve 38/valve body 40/seat 44 with respect to the flow of fluid can have its bulk or majority volume located downstream of the valve 38/valve body 40/seat 44. However, a small portion of the fluid positioned downstream (or generally downstream) of the valve 38/valve body 40/seat 44 with regard to flow direction, namely the portion located in the cavity 68/chambers 54, 66, can be positioned geometrically or physically above/"upstream" of the valve seat 44 (e.g. is vertically above the valve seat 44 in FIG. 5). In other words, in FIG. 5 the portion of fluid in the cavity 68/chambers 54, 66 is positioned geometrically above the valve seat 44, but can still be positioned downstream of the valve seat 44 with respect to the flow direction of the fluid and be considered part of the downstream fluid path 22*b*. Similarly, the exposed surface 76 of the valve body 40 can be located geometrically above/upstream of the seat 44 when the valve 38 is in the closed position, but be exposed to fluid/pressure of the downstream fluid path 22*b*. Moreover, as shown in FIG. 5, at least part the upstream fluid path 22*a* is in direct contact with the valve body 40, and overlaps in a radial direction (see line 80) with at least part of the downstream fluid path 22*b* and is in direct contact with the valve body 40.

As noted above, in the embodiment of FIG. 5 the exposed surface area 76 is the effective surface area of the valve body 40 exposed to the downstream fluid path 22*b*, located physically/geometrically above the valve seat 44 when the valve 38 is in the closed position. Diameter 84, which represents the diameter/surface area of the seat 44, can be considered to represent the total surface area of the valve 38/valve body 40 that in theory can be acted upon by pressure in the upstream fluid path 22*a* (e.g. surface 72 of FIG. 9). Diameter 82 represents the diameter/surface area of the valve 38/valve body 40 that is fluidly isolated from pressure in the upstream fluid path 22*a* (e.g. surface 76 of FIG. 5). In the illustrated embodiment, the area represented by diameter 84 is larger than the area represented by diameter 82, resulting in residual area/surface 74 of FIG. 5, upon which pressure in the upstream fluid path 22*a* acts. This arrangement reduces pressure acting on the valve 38 when the valve 38 is in this closed position, but does not reduce pressure so much that the valve 38 can typically be inadvertently opened, for example by unexpectedly high downstream pressures.

Thus in this case an area of the exposed surface area 76 on the upper/upstream surface of the valve body 40, exposed to the downstream fluid path 22*b*, can be equal to or less than an area of the lower/downstream surface of the valve body 40 exposed to fluid in the downstream fluid path 22*b* when the valve 38 is closed. In the case when the diameters 82, 84 are equal, the pressure force is balanced and the closing force of the valve 38 is determined entirely by the biasing member 50. In yet another case, if desired the surface area/diameter 82 can be increased such that it is larger than the surface area/diameter 84 (e.g. decreasing or eliminating surface area 74, and thereby reducing or eliminating pressure-applied closing force). This arrangement may provide a pressure assist feature for reducing the closing force and/or opening the valve 38 and may provide a force that opposes the biasing member 50, and may reduce the force required to open the valve 38. In this arrangement measures may be implemented to ensure inadvertent opening of the valve 38 is avoided or minimized, such as providing a relatively strong biasing member 50.

In the embodiments of FIGS. 2-6, the biasing member 50 is positioned inside the cavity 68/chambers 54, 66. However, if desired the biasing member 50 can be positioned outside the cavity 68/chambers 54, 66, as shown for example in FIG. 7. In this case, the cap 58 may include an annular groove 86 to receive or position the biasing member 50 therein.

In the embodiments of FIG. 2-7, the opening 70 is provided in the valve body 40, and the cavity 68/chambers 54, 66 are fluidly isolated from the ambient environmental atmosphere. However, in the embodiment of FIG. 8, the opening 70 is omitted, and the cavity 68/chambers 54, 66 are in fluid communication with the ambient environment/atmosphere via an opening 88 formed in the cap 58/nozzle body 32. This arrangement can reduce pressure on the exposed surfaces 76 of the valve body 40, since the ambient pressure is typically less than the pressure of fluid in the fluid path 22 on the upstream side of the valve seat 44 (upstream fluid path 22*a*) when the valve 38 is in the closed position. Thus the embodiment of FIG. 8 can operate on similar principles to the embodiments outlined above.

The disclosed design significantly reduces pressure acting on the valve 38 when the valve 38 is in the closed position, making opening of the valve 38 significantly easier. The opening force can be made entirely or largely independent of pressure in the fluid path 22, and entirely or largely controlled by the biasing member 50, which is more predictable and can be specifically designed and engineered to provide the desired operating characteristics. In addition, the valve 38 is easier to operate when the valve 38 is at or near the closed position, increasing ease of dispensing small amounts of liquid/fluid. In addition, it should be understood that while the system is shown and described in the context of a nozzle for dispensing fluid, the system can be used in nearly any fluid handling device having a valve through which pressure is designed to flow.

Having described the invention in detail and by reference to the various embodiments, it should be understood that modifications and variations thereof are possible without departing from the scope of the invention.

What is claimed is:

1. A nozzle for dispensing fluid comprising:

a nozzle body including a fluid path therein through which fluid is configured to flow in a downstream direction; and a valve including a valve body positioned in the fluid path and movable between a closed position wherein the valve body sealingly engages a valve seat to generally block fluid from flowing therethrough, and an open position wherein the valve body is spaced away from the valve seat to generally allow fluid to flow therethrough, wherein at least part of an outer surface of the valve body positioned upstream of the valve seat is configured to be fluidly isolated from a pressure of fluid in the fluid path upstream of the valve seat when the valve is in the closed position.

2. The nozzle of claim 1 wherein the at least part of a surface of the valve body is positioned geometrically or physically upstream of the valve seat, but is positioned downstream of the valve seat relative to a flow of fluid through the fluid path of the nozzle.

3. The nozzle of claim 1 wherein the at least part of a surface of the valve body is positioned geometrically or physically upstream of the valve seat, and wherein the fluid in the fluid path located upstream of the valve seat is located upstream of the valve seat relative to a flow of fluid through the nozzle.

4. The nozzle of claim 1 wherein the at least part of the surface of the valve body includes a geometric center of an upstream surface of the valve body.

5. The nozzle of claim 1 wherein the at least part of the surface of the valve body includes at least about 25% of an effective surface area of an upstream surface of the valve body.

6. The nozzle of claim 1 wherein the at least part of the surface of the valve body is configured to be exposed to a pressure of fluid in the fluid path downstream of the valve seat relative to a flow of fluid through the nozzle when the valve is in the closed position.

7. The nozzle of claim 1 wherein the valve body includes an opening extending therethrough having a first end in fluid communication with at least part of the fluid path on a geometric upstream side of the valve seat and having a second end in fluid communication with the fluid path on a geometric downstream side of the valve seat when the valve is in the closed position, wherein the valve is configured such that first and second ends of the openings are both in fluid communication with fluid located downstream of the valve seat when the valve is in the closed position.

8. The nozzle of claim 1 wherein the nozzle body includes a cavity configured to be positioned geometrically upstream of the valve seat when the valve is in the closed position, wherein the cavity is configured to be fluidly isolated from the fluid path positioned upstream of the valve seat relative to a flow of fluid through the nozzle when the valve is in the closed position.

9. The nozzle of claim 8 wherein the cavity is configured to be in fluid communication with the fluid path located downstream of the valve seat when the valve is in the closed position.

10. The nozzle of claim 8 wherein the valve body includes an opening extending therethrough that is in fluid communication with the cavity and in fluid communication with the fluid path downstream of the valve seat, when the valve is in the closed position.

11. The nozzle of claim 8 wherein the nozzle includes a biasing member that biases the valve body toward the closed position, and wherein the biasing member is positioned in the cavity.

12. The nozzle of claim 8 wherein the nozzle includes a biasing member that biases the valve toward the closed position, and wherein the biasing member is positioned outside the cavity.

13. The nozzle of claim 1 wherein the valve body includes a total effective surface area in a direction perpendicular to a direction of movement of the valve body when the valve body moves between the open position and the closed position, wherein the total effective surface area is located radially inside the valve seat, and wherein an effective surface area of the at least part of a surface of the valve body is less than the total effective surface area.

14. The nozzle of claim 1 wherein at least part of the fluid path located upstream of the valve seat relative to a flow of fluid through the nozzle and in direct contact with the valve body overlaps in a radial direction with at least part of the fluid path located downstream of the valve seat relative to a flow of fluid through the nozzle and in direct contact with the valve body.

15. The nozzle of claim 1 wherein the nozzle body includes an opening extending therethrough that is in fluid communication with the valve body on a physical or geometric upstream side of the valve seat and that is in fluid communication with ambient environment.

16. The nozzle of claim 1 wherein pressurized fluid is positioned in the fluid path, wherein the valve is in the closed position, and wherein the at least part of the surface of the valve body is fluidly isolated from the pressure of fluid in fluid path upstream of the valve seat relative to a flow of fluid through the nozzle.

17. The nozzle of claim 1 wherein the valve is biased into engagement with the valve seat, and wherein the nozzle includes an actuator operatively connectable to the valve and manually operable to move the valve at least one of to or from the closed position.

18. The nozzle of claim 1 wherein the nozzle is fluidly coupled to a fluid storage tank storing fuel therein, and is fluidly coupled to a pump configured to convey fuel from the storage tank to the nozzle.

19. The nozzle of claim 1 wherein the nozzle includes an actuator operatively connectable to the valve and manually operable in appropriate conditions to move the valve body at least one of to or from the closed position.

20. The nozzle of claim 19 further comprising a stem operatively coupled to the actuator, wherein the valve body is carried on the stem such that when the actuator is raised the stem is movable, thereby opening the valve body.

21. The nozzle of claim 1 wherein at least part of an outermost surface of the valve body positioned upstream of the valve seat is configured to be fluidly isolated from a pressure of fluid in the fluid path upstream of the valve seat when the valve is in the closed position.

22. A nozzle for dispensing fluid comprising:

a nozzle body including a fluid path therein through which fluid is configured to flow in a downstream direction; and a valve including a valve body positioned in the fluid path and movable between a closed position wherein the valve body sealingly engages a valve seat to generally block fluid from flowing therethrough, and an open position wherein the valve body is spaced away from the valve seat to generally allow fluid to flow therethrough, wherein the valve body includes an opening extending therethrough having a first end in fluid communication with at least part of the fluid path on a geometric upstream side of the valve seat and having a second end in fluid communication with the fluid path on a geometric downstream side of the valve seat when the valve is in the closed position, wherein the valve is configured that first and second ends of the openings are both in fluid communication with the fluid path located downstream of the valve seat when the valve is in the closed position.

23. The nozzle of claim 22 wherein the valve includes a cavity positioned on a geometric upstream side of the valve seat that is fluidly isolated from the fluid path positioned upstream of the valve seat when the valve is in the closed position, and wherein the opening is in fluid communication with the cavity.

24. The nozzle of claim 23 wherein the opening extends entirely through the valve body in a direction of movement of the valve body, and wherein at least part of an upstream surface of the valve is configured to be fluidly isolated from a pressure of fluid in fluid path upstream of the valve seat when the valve is in the closed position.

25. A nozzle for dispensing fluid comprising:

a nozzle body including a fluid path therein through which fluid is configured to flow in a downstream direction;

a valve including a valve body positioned in the fluid path and movable between a closed position wherein the valve body sealingly engages a valve seat to generally block fluid from flowing therethrough, and an open position wherein the valve body is spaced away from the valve seat to generally allow fluid to flow therethrough; and a cavity positioned geometrically upstream of the valve seat and configured to be fluidly isolated from fluid in the fluid path upstream of the valve seat when the valve is in the closed position, wherein at least part of the valve body is in fluid communication with the cavity.

26. The nozzle of claim 25 wherein the valve body includes an opening formed therethrough and configured to provide communication between the cavity and a portion of the fluid path positioned geometrically downstream of the valve seat when the valve is in the closed position, wherein the cavity is sealed, and wherein the at least part of the valve body is an upstream surface of the valve body positioned in the cavity.

27. The nozzle of claim 25 wherein the valve body includes an opening extending therethrough having a first end in fluid communication with at least part of the fluid path on a geometric upstream side of the valve seat and having a second end in fluid communication with the fluid path on a geometric downstream side of the valve seat when the valve is in the closed position, wherein the valve is configured such that first and second ends of the openings are both in fluid communication with fluid located downstream of the valve seat when the valve is in the closed position.

28. A nozzle for dispensing fluid comprising:

a nozzle body including a fluid path therein through which fluid is configured to flow in a flow direction; and a valve including a valve body positioned in the fluid path and movable between a closed position wherein the valve body sealingly engages a valve seat to generally block fluid from flowing therethrough, and an open position wherein the valve body is spaced away from the valve seat to generally allow fluid to flow therethrough, wherein the nozzle is configured such that, when the valve is closed, at least part of the fluid path located upstream of the valve seat with respect to the flow direction and in direct contact with the valve body overlaps in a radial direction with at least part of the fluid path located downstream of the valve seat with respect to the flow direction and in direct contact with the valve body.

29. The nozzle of claim 28 wherein the nozzle body includes a cavity configured to be positioned geometrically upstream of the valve seat when the valve is in the closed position, wherein the cavity is configured to be fluidly isolated from the fluid path positioned upstream of the valve seat relative to a flow of fluid through the nozzle when the valve is in the closed position, and wherein the cavity is configured to be in fluid communication with the fluid path located downstream of the valve seat when the valve is in the closed position.

* * * * *